United States Patent [19]
Schlessmann et al.

[11] Patent Number: 5,165,565
[45] Date of Patent: Nov. 24, 1992

[54] CLOSURE FOR A VESSEL

[75] Inventors: Helmut Schlessmann, Waiblingen; Georg Becker; Gerhard Stoll, both of Winnenden, all of Fed. Rep. of Germany

[73] Assignee: Andreas Stihl, Waiblingen, Fed. Rep. of Germany

[21] Appl. No.: 890,185

[22] Filed: May 29, 1992

[30] Foreign Application Priority Data

Jun. 4, 1991 [DE] Fed. Rep. of Germany ... 9106814[U]

[51] Int. Cl.$^5$ .............................................. B65D 53/00
[52] U.S. Cl. ..................................... 220/304; 220/375
[58] Field of Search ....................... 215/350, 352, 306; 220/304, 375, DIG. 33

[56] References Cited

U.S. PATENT DOCUMENTS

| | | | |
|---|---|---|---|
| 3,331,523 | 7/1967 | Exton | 215/350 |
| 3,480,169 | 11/1969 | Hammes | 215/352 |
| 4,113,138 | 9/1978 | Fields et al. | 220/375 X |
| 4,416,391 | 11/1983 | Sarrazin | 220/304 |
| 4,867,337 | 9/1989 | Eichenseer | 220/375 |
| 4,872,587 | 10/1989 | Zimmermann et al. | 220/375 |

Primary Examiner—Stephen Marcus
Assistant Examiner—Nova Stucker
Attorney, Agent, or Firm—Walter Ottesen

[57] ABSTRACT

The invention relates to a closure for closing a vessel for holding liquid such as a fuel tank or the like. The closure includes a cylindrical, cup-shaped base body having an internal thread. The base wall of the base body has an inner wall surface on which a centrally aligned annular wall is formed. A flat sealing ring is arranged between the annular wall and the cylindrical wall. The sealing ring is arranged so as to have radial play with respect to the annular wall and a radially projecting insert is attached to the base wall of the base body. The insert has a side facing toward the base wall and includes a centering ring on this side which coacts with the annular wall to align the insert with respect to the base body. At least one attachment element is arranged within the centering ring and bridges the gap between the insert and the base wall. The insert is fixed to the base wall with the attachment element.

11 Claims, 2 Drawing Sheets

CLOSURE FOR A VESSEL

FIELD OF THE INVENTION

The invention relates to a closure for a vessel for holding liquid such as a fuel tank or the like. The fuel tank can be for a portable handheld work apparatus such as a chain saw driven by a gasoline engine.

BACKGROUND OF THE INVENTION

U.S. Pat. No. 4,867,337 discloses a threaded closure for a fuel tank. The threaded closure includes a cylindrical, cup-shaped base body having an internal thread. An annular wall disposed inwardly is formed on the base wall of the base body and stands perpendicularly to this base wall. The annular wall and the cylindrical wall conjointly delimit a receiving space in which a flat sealing ring is inserted without play. A limp connecting part is fixed to the base body within the annular wall and includes a retaining member which prevents the closure from becoming separated from the tank and becoming lost.

The sealing ring is made mostly of rubber and swells with time because of the contact with the fuel and is pressed out of the receiving space in the base body of the threaded closure. Since no further retention is provided, the danger is present that the sealing ring will become lost and a leak-proof closure of the fuel tank is no longer ensured.

SUMMARY OF THE INVENTION

It is an object of the invention to provide a closure wherein the sealing ring is so mounted that it cannot become separated and lost even when the sealing ring swells.

The invention is directed to a closure for a tank for holding liquid, the closure including a cylindrical, cup-shaped base body defining a longitudinal center axis; the base body having a base wall and a cylindrical wall extending downwardly from the base wall and centered on the axis; the base wall having an inside wall surface surrounded by the cylindrical wall; the base body having an annular wall extending downwardly from the inside wall surface so as to be concentric with the cylindrical wall; a flat sealing ring disposed between the cylindrical wall and the annular wall so as to surround the annular wall with radial play; an insert mounted on the inside wall surface of the base wall and being configured so as to extend radially over the annular wall so as to retain the sealing ring between the cylindrical wall and the annular wall; the insert having an insert surface facing the inside wall surface of the base wall and the surfaces conjointly defining a gap therebetween; the insert having a centering ring formed on the insert wall for coacting with the annular wall to align the insert with the axis; and, attachment means disposed within the centering ring for bridging the gap to fixedly attach the insert to the base body.

Since the sealing ring surrounds the annular wall with play, there is sufficient compensating space available which accommodates the overdimension which occurs when the sealing ring swells. The overhang of the insert prevents loss of the sealing ring notwithstanding the play with which the sealing ring is mounted in the receiving space. The centering ring of the insert coacts with the annular wall to provide a coaxial alignment of the insert with the longitudinal center axis defined by the base body. Accordingly, a uniform overhang is ensured over the entire periphery of the sealing ring.

The base body and insert are both made of plastic so that a softening of the plastic occurs when the base body and insert are joined. For this reason, at least one attachment element is arranged within the centering ring which bridges the gap between the insert and the base wall of the base body. If the attachment element becomes soft, the centering ring coacting with the annular wall ensures a correct position of the insert in the base body.

The attachment element is advantageously an attachment ring arranged on the insert which is joined to the base wall of the base body by welding, preferably by ultrasonic welding.

According to another feature of the invention, the insert simultaneously serves as a carrier for a retaining bracket which can be secured in the insert stub of the tank thereby connecting the closure to the tank and preventing the closure from becoming separated from the tank. In this way, the closure cannot become lost. For this reason, no special arrangement must be formed on the base body of the closure for fixing the retaining bracket.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
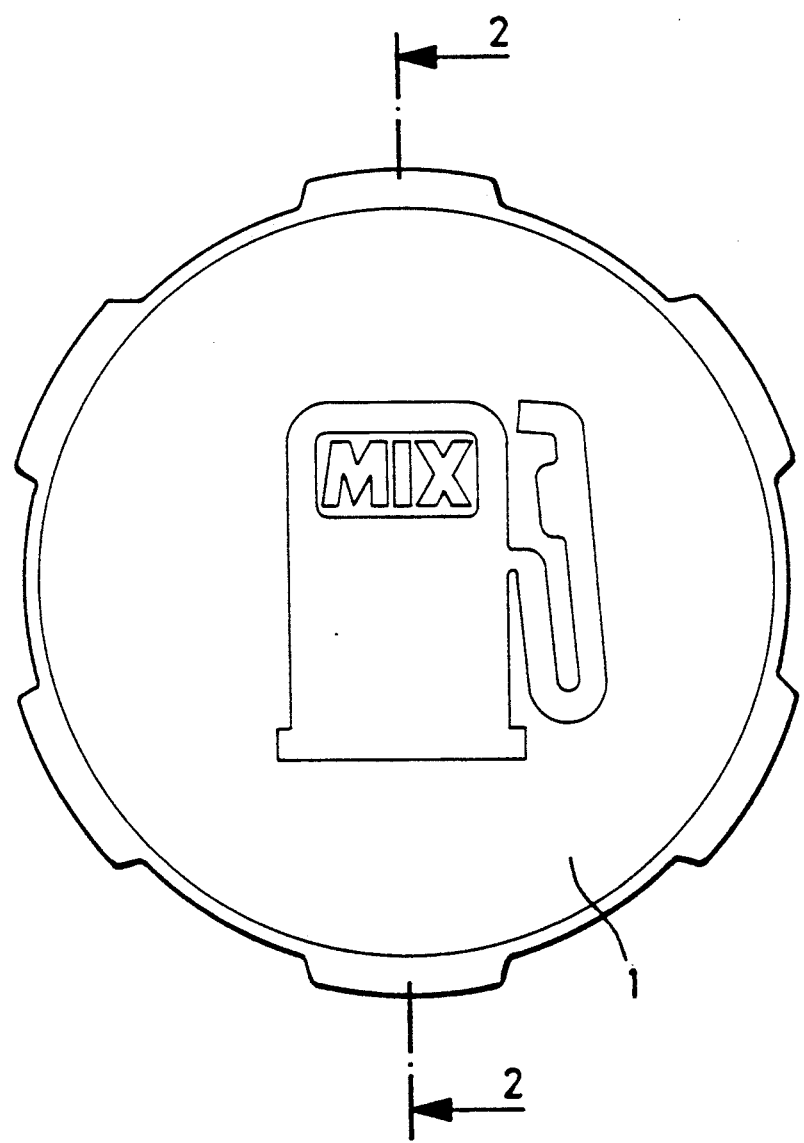
FIG. 1 is a top plan view of a closure according to the invention.

The threaded closure 1 of the embodiment is in the form of a tank cap for closing a fuel tank and especially a fuel tank on a portable handheld work apparatus driven by an internal combustion engine such as a motor-driven chain saw, cutoff machine, brushcutter or the like.

The threaded closure 1 includes a cup-shaped base body made of plastic having a cylindrical wall 2 and a base wall 3. The cylindrical wall 2 has an internal thread 4 on its inner side which extends over the entire elevation of the cylindrical wall 2. An annular wall 6 is arranged on the inner side 3a of the base wall 3 and is coaxial to the longitudinal center axis 5. The annular wall 6 is preferably configured as a single piece with the base body. The annular wall 6 stands perpendicularly on the base wall 3 and the cylindrical wall 2 and annular wall 6 conjointly delimit an annular receiving space 7 for an essentially flat sealing ring 8 made, for example, of rubber. The sealing ring 8 lies in its receiving space 7 with a radial play (u) to the annular wall 6. Play is also present along a portion of the periphery of the sealing ring 8 relative to the cylindrical wall 2 because of the internal thread 4.

The center of the base wall 3 is covered by a central insert 10 which essentially has the base form of a disc and radially overhangs the annular wall 6. The insert 10 carries a centering ring 9 on the side thereof facing toward the base wall. The centering ring 9 coacts with the annular wall 6 when the insert 10 is mounted and coaxially aligns the insert 10 to the longitudinal center axis 5 of the threaded closure 1.

Figure 2:
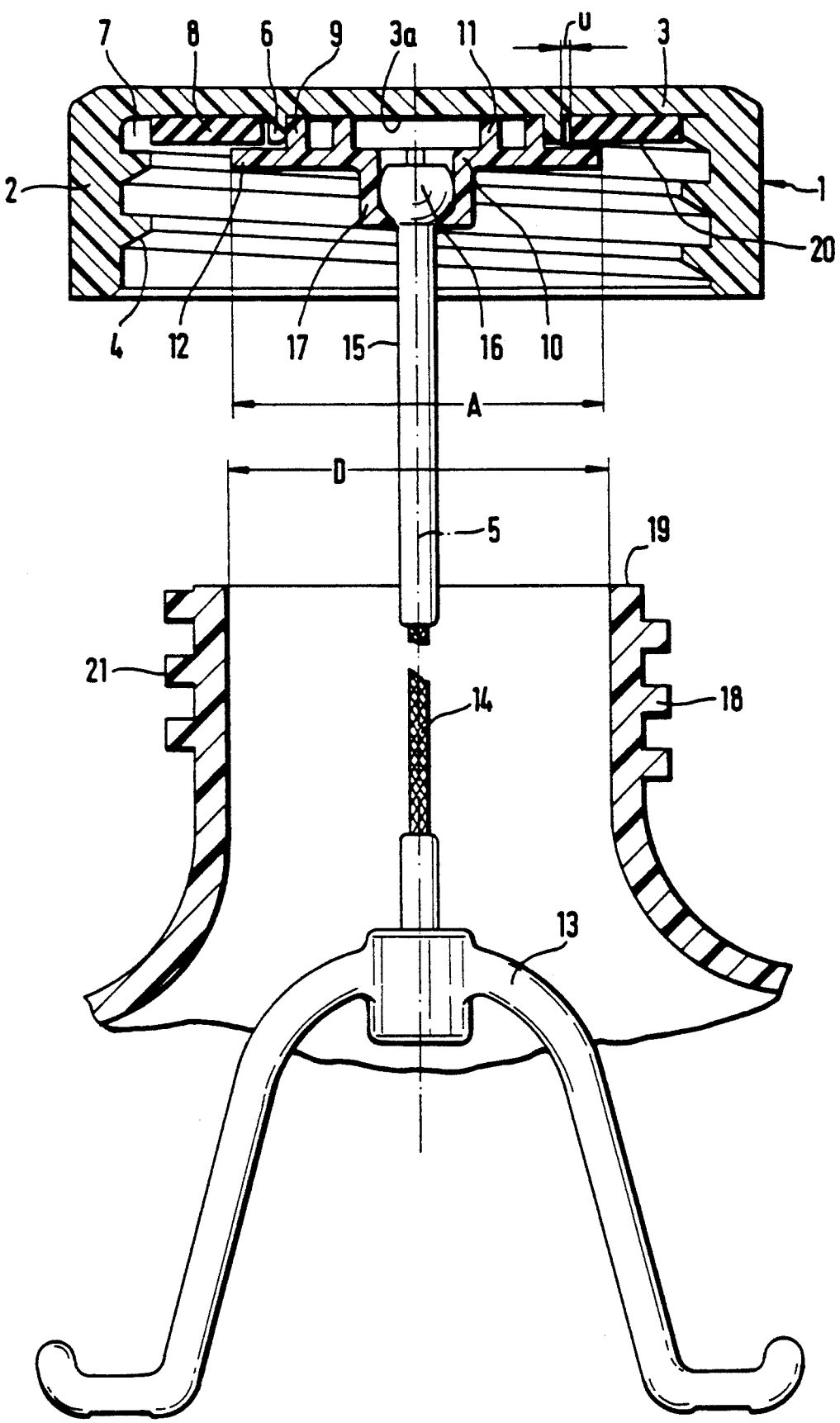
FIG. 2 is a section view of the closure taken along line 2—2 of FIG. 1.

As shown in FIG. 2, the centering ring 9 lies advantageously within the annular wall 6; however, it can be advantageous to arrange the centering ring 9 so that it lies outside of the annular wall 6.

At least one attachment element 11 is arranged within the centering ring 9 and joins the base wall 3 to the insert 10. The attachment element is advantageously configured as a single piece together with the centering ring and the insert 10. In the embodiment shown, the attachment element is an attachment ring 11 which is spaced radially to the centering ring 9 and lies within the latter and is aligned coaxially to the longitudinal center axis 5 of the threaded closure 1.

The insert 10 is likewise made of plastic and is advantageously inseparably joined to the base body of the threaded closure 1, namely, to the base wall 3. For this purpose, the attachment ring 11 can be fixedly attached to the base wall 3 with adhesive. Preferably, the attachment ring 11 is welded to the base wall 3 such as by ultrasonic welding. Especially in this type of attachment, the attachment ring 11 becomes soft during the welding operation and can therefore not ensure the position of the insert 10. The insert 10 is fixed in position by the centering ring 9 which lies in a precise fit contact engagement on the annular wall 6. In this way, it is ensured that the insert 10 is connected in its correct position to the base wall 3 of the base body 2.

The configuration of the attachment ring 11 separate from the centering ring 9 affords the advantage that the threaded closure 1 can be removed from the apparatus directly after the ultrasonic welding operation without first having to await for the welded plastic material to cool and become solid. The clock times for attaching an insert in a base body of the threaded closure can therefore be held very small.

In order to obtain a good adhesive or weld connection, the end face of the attachment ring 11 facing toward the base wall 3 and preferably also the end face of the centering ring 9 are configured so as to be plane-parallel to the inner wall surface 3a of the base wall. It can also be advantageous to fixedly clip the centering ring 9 to the annular wall 6 while omitting the attachment ring 11.

Because of the radial overhang 12 of the insert over the receiving space 7, the sealing ring 8 is overlapped approximately over one fourth of its radial width and is therefore held in its annular-shaped receiving space 7 so that it cannot become separated therefrom and lost. Because of the radial play of the sealing ring in the receiving space 7, the occurrence of an overdimensioning or swelling of the sealing ring 8 as a consequence of contact with fuel is compensated without the danger being present that the sealing ring 8 presses out of the receiving space 7.

The spacing of the insert 10 from the base wall 3 of the base body is advantageously determined by the elevation of the centering ring 9 and is so dimensioned that the sealing ring 8 is held so that it can move somewhat between the overhang 12 and the base wall 3.

The insert 10 also serves to hold a holding bracket 13 on the threaded closure 1. For this purpose, the holding bracket 13 is attached to the insert 10 via a limp connecting part 14 (such as a cord or the like) and a rigid plastic end piece 15 which is preferably formed by spraying. In the embodiment shown, the end piece 15 has a thickened, ball-like, free end 16 which is held in a correspondingly configured cylindrical receiving space 17 of the insert 10. The cylindrical receiving space 17 is configured on the side of the insert 10 facing away from the base wall and projects outwardly from the base plate of the insert 10 in the direction of the longitudinal center axis 5 into the base body 2.

The retaining bracket 13 is made of plastic and is configured to have a quasi V-shape as shown in the side elevation view of FIG. 2. The free ends of the retaining bracket 13 are bent over to have a hook-like shape and are spaced from each other at a distance which is greater than the inner diameter D of the filling stub 18 of the fuel tank. The retaining bracket 13 is pressed together for inserting the same into the filling stub 18. In the fuel tank, the retaining bracket 13 again assumes its original form so that the retaining bracket holds the threaded enclosure 1 so that it is prevented from becoming separated from the fuel tank and cannot be lost. The base body 2 and the insert 10 are attached to the retaining bracket 13 via the limp connecting part 14.

In the embodiment shown, the outer diameter A of the insert 10 corresponds approximately to the inner diameter D of the filling stub 18. The insert 10 then lies with a precise fit in the filling stub 10 when the closure 1 is threadably engaged therewith so that it is ensured that the sealing ring 8 comes into contact engagement with its sealing surface 20 in the correct position on the sealing edge 19 of the filling stub 18. In this way, a leak-free seal is ensured. For this purpose, the threaded closure is tightly threadably engaged to the outer winding 21 of the filling stub 18.

A POM (polyoxymethalene) is used as a plastic for the base body and the insert 10. Polypropylene is advantageously used.

It is understood that the foregoing description is that of the preferred embodiments of the invention and that various changes and modifications may be made thereto without departing from the spirit and scope of the invention as defined in the appended claims.

What is claimed is:

1. A closure for a tank for holding liquid, the closure comprising:

a cylindrical, cup-shaped base body defining a longitudinal center axis;

said base body having a base wall and a cylindrical wall extending downwardly from said base wall and centered on said axis;

said base wall having an inside wall surface surrounded by said cylindrical wall;

said base body having an annular wall extending downwardly from said inside wall surface so as to be concentric with said cylindrical wall;

a flat sealing ring disposed between said cylindrical wall and said annular wall so as to surround said annular wall with radial play;

an insert mounted on said inside wall surface of said base wall and being configured so as to extend radially over said annular wall so as to retain said sealing ring between said cylindrical wall and said annular wall;

said insert having an insert surface facing said inside wall surface of said base wall and said surfaces conjointly defining a gap therebetween;

said insert having a centering ring formed on said insert wall for coacting with said annular wall to align said insert with said axis; and, attachment means disposed within said centering ring for bridging said gap to fixedly attach said insert to said base body.

2. The closure of claim 1, said attachment means being an attachment element of said insert welded to said base wall.

3. The closure of claim 1, said attachment means being an attachment element of said insert glued to said base wall with adhesive means.

4. The closure of claim 1, said centering ring and said attachment means being formed as a single piece with said insert.

5. The closure of claim 1, said attachment means being an attachment ring arranged on said insert.

6. The closure of claim 5, said attachment ring being disposed so as to be radially spaced from said centering ring.

7. The closure of claim 6, said attachment ring being coaxially aligned with respect to said axis.

8. The closure of claim 1, said sealing ring having a predetermined radial width and said insert extending over approximately one-quarter of said radial width.

9. The closure of claim 1, wherein said tank has a filling stub formed thereon and said closure further comprises retaining means for holding said closure on the filling stub so as to prevent said closure from becoming separated from the tank.

10. The closure of claim 9, said base body being removably attachable to said filling stub and, said retaining means including: a limp connecting member having first and second ends, said insert being connected to said first end; and, a holding member connected to said second end and being insertable into the tank through said filling stub for preventing said base body from being separated from the tank after being removed from said filling stub.

11. The closure of claim 1, wherein said tank has a filling stub formed thereon, said filling stub having an inner diameter D and said insert having an outer diameter A; and, said outer diameter A corresponding approximately to said inner diameter D.

* * * * *